United States Patent [19]

De Bot

[11] Patent Number: 5,581,578
[45] Date of Patent: Dec. 3, 1996

[54] DIGITAL COMMUNICATION SYSTEM AND A RECEIVER FOR USE IN SUCH A SYSTEM

[75] Inventor: Paulus G. M. De Bot, Eindhoven, Netherlands

[73] Assignee: U.S. Philips Corporation, New York, N.Y.

[21] Appl. No.: 350,201

[22] Filed: Dec. 5, 1994

[30] Foreign Application Priority Data

Dec. 3, 1993 [EP] European Pat. Off. .............. 93203393

[51] Int. Cl.⁶ .............................. H04L 5/12; H04L 23/02; H04L 27/06; H04L 27/04
[52] U.S. Cl. .................... 375/261; 375/298; 375/340
[58] Field of Search ...................... 375/261, 340, 375/283, 330, 295, 298, 316, 341, 260; 329/304; 332/103; 370/110.1, 110.4; 348/472, 426, 437

[56] References Cited

U.S. PATENT DOCUMENTS

| | | | |
|---|---|---|---|
| 5,105,442 | 4/1992 | Wei | 375/261 |
| 5,105,443 | 4/1992 | Betts et al. | 375/261 |
| 5,267,021 | 11/1993 | Ramchandran et al. | 375/261 |
| 5,305,352 | 4/1994 | Calderbank et al. | 375/261 |
| 5,311,546 | 5/1994 | Paik et al. | 375/232 |
| 5,315,619 | 5/1994 | Bhatt | 375/340 |
| 5,345,440 | 9/1994 | Gledhill et al. | 375/376 |
| 5,386,239 | 1/1995 | Wang et al. | 348/472 |
| 5,394,440 | 2/1995 | Goldstein et al. | 375/295 |

FOREIGN PATENT DOCUMENTS 9205646  4/1992  WIPO .............................. H04L 5/06

OTHER PUBLICATIONS

"Digital Communication", by Edward A. Lee et al, pp. 167–172; 184–186; 198–206.

Primary Examiner—Tesfaldet Bocure
Attorney, Agent, or Firm—Anne E. Barschall

[57] ABSTRACT

Known in a digital communication system (1) are phase recovery methods for QPSK modulated signals. It is proposed to extend such methods to multi-resolution QAM signals, which can be represented by rotationally invariant signal constellations. To this end, with each received symbol ($r_i$), a phase reference ($\phi_i$) for a high priority-bit (HP-bits) constellation is determined, and with respect to this phase reference ($\phi_i$), a sub-constellation (CLx) for low-priority bits (LP-bits) is constructed, the sub-constellation (CLx) being rotationally invariant. The sub-configuration (CLx) is translated to an origin (O) of the signal constellation, and then the low priority-bits (LP-bits) are determined by determining a minimum squared Euclidean distance (Ed) of the rotated and translated received symbol ($b_i'$) with respect to the rotated and translated sub-constellation. For a 2R(2,2)-QAM signal constellation a simple detection method is thus provided. The method can be made adaptive, and can also be made recursive for more complicated signal constellations such as a 64-QAM signal constellation.

19 Claims, 4 Drawing Sheets

DIGITAL COMMUNICATION SYSTEM AND A RECEIVER FOR USE IN SUCH A SYSTEM

BACKGROUND OF THE INVENTION

1. Field of the Invention

The present invention relates to a digital communication system comprising a transmitter for transmitting digital messages representing symbols modulated onto at least one carder, which symbols are representable as symbol vectors in a signal constellation which is rotationally invariant over a predetermined rotation angle, the system further comprising a transmission channel and a receiver for receiving the symbols transmitted through the channel, which receiver comprises a demodulator for demodulating the received symbols into received messages, the demodulator using an estimate for a channel state of the channel. Such a system can be a Digital Television Broadcasting System in which a digital signal is broadcasted to digital TV receivers, or any other digital communication system.

The present invention further relates to a receiver for use in such a system.

2. Description of the Related Art

A system of this kind is known from U.S. Pat. No. 5,345,440 and the International patent application WO 92/05646. In this system OFDM (Orthogonal Frequency Division Multiplexed) signals are transmitted by a transmitter to a receiver through a transmission channel. On each carrier of this multi-carrier system, symbols to be transmitted are QPSK (Quadrature Phase Shift Keying) modulated. An OFDM signal is obtained by supplying a QPSK symbol stream to an Inverse Discrete Fourier Transformer. The QPSK signals can be considered as two bit binary messages representing symbols on a carrier. The symbols can be represented as symbol vectors in a signal constellation which is rotationally invariant over a predetermined angle. In the example given the signal configuration consists of four constellation points, representing two bit binary messages "00", "10", "11", and "10". In case of differential encoding, starting from an initial symbol state, the messages are encoded as a phase difference between two successive symbols. Then, in the receiver, it is not necessary to know the exact phase, but, starting from a first detected symbol, the succeeding symbols are detected from relative phases of symbols. The transmitted symbols are subject to noise and to channel distortion. Therefore, the received symbols are amplitude and phase shift modulated QPSK signals. In a complex plane, the received symbols are scattered around four points of a four point signal constellation, or, stated otherwise, when many symbols are received the received symbols can be plotted as four clouds of end points of received symbol vectors in the complex plane. Before proper demodulation, a position of two notional perpendicular axes, which are symmetrical to center of the signal clouds, must be found. For this reason, in the known receiver, a separate phase recovery method is disclosed for each subcarrier of the received OFDM signal. In this method, with demodulation, a channel state is estimated, which varies with time. More particularly a channel phase shift is estimated recursively, i.e. with each of the received symbols, the position of the notional axes with respect to the symbol clouds is updated. Starting with a phase reference signal which is set equal to the first received signal, a reference phase which is set equal to an argument of the phase reference signal, and notional axes at 45° and 135° to the signal vector, a next received symbol is rotated with a multiple of 90° such that it falls within 45° sectors at both sides of the reference phase. That is, a minimum squared Euclidean distance is determined, when detecting the symbol. From the number of 90° rotations, the transmitted binary message can be detected. The phase reference signal is updated with the received rotated vector, and, consequently, the reference phase. This method is shown to be Maximum Likelihood in most practical cases. In digital communication systems, also symbols represent constellations are transmitted. For example for Digital Video Broadcasting a so-called 2R(2,2)-QAM constellation can be used. Such a constellation is a 2-resolution configuration, i.e. a constellation representing symbols of which a first group of 2 bits for encoding the symbols represents constellation points in respective quadrants of the signal constellation, and of which a second group of 2 bits for encoding the symbols represents constellation points within the quadrants. The first group of bits are so-called high priority bits, and the second group of bits are so-called low priority bits. When symbols representing video signals are transmitted using such a 2R(2,2)-QAM signal constellation, at the receiver side, depending on the signal-to-noise ratio, the video signals can be detected with low resolution by only detecting the high priority bits and the video signals can be detected with high resolution by also detecting the low priority bits. The 2R(2,2)-QAM constellation is rotationally invariant as to rotation of clusters of constellation points in the respective quadrants over a multiple of 90°. In this sense, also other signal constellations, which can be multiresolution or not, are rotationally invariant, such as a 64-QAM constellation. Such signal constellations is described in the handbook "Digital Communication", E. A. Lee et al., Kluwer Academic Publishers, 1990, Chapter 6.5. "Signal Set Design", pages 198–206. In the same handbook transmitters and receivers are described for transmitting and receiving of symbols from such constellations.

SUMMARY AND OBJECTS OF THE INVENTION

It is an object of the present invention to provide a digital communication system in which received symbols representable by rotationally invariant signal constellations can be easily detected.

To this end the digital telecommunication system according to the present invention is characterized in that the signal constellation is partitioned into clusters of constellation points which coincide when at least once rotated over the predetermined rotation angle, the clusters representing a first group of bits in the messages and constellation points within the clusters representing at least a second group of bits in the messages, and in that the first group of bits is demodulated by rotating a cluster containing a received symbol over an integer number of times of the predetermined rotation angle such that the received symbol is located in a partition of the signal constellation containing the estimate for the channel state and by determining the first group of bits from the rotation, and the second group of bits is demodulated by translating the rotated cluster to an origin of the signal constellation and by determining the second group of bits from the translated cluster, the estimate being updated with each received symbol. By rotating the cluster containing the received symbol to the partition containing the channel state estimate and by updating the channel state estimate with each received symbol, information about the first group of bits is achieved. The channel state estimate can be determined as according to the method disclosed in U.S. Pat. No.

5,345,440 and WO 92/05646, then, or by subjecting the received signal to a $M^{th}$-order power loop, known per se, for a 360°/M rotationally invariant constellation, M being a positive integer greater than 2. By translating the rotated cluster to the origin of the signal configuration, information about the second group of bits is obtained. After translation to the origin, the method disclosed in U.S. Pat. No. 5,345, 440 and WO 92/05646 can be used for obtaining the information about the second group of bits. The estimate for the channel state can be fine adjusted by using amplitude and phase information about the thus recovered symbol. Accordingly, a very simple detection mechanism is obtained.

The present invention is based upon the insight that with detection of the second group of bits, the phase information in the estimate for the channel state is preserved when translating a cluster to the origin of the signal constellation.

In an embodiment of a digital communication system according to the present invention, the constellation points within the clusters represent a third group of bits within the second group of bits, the second group of bits being representative for a rotationally invariant further cluster within the cluster, and wherein the third group of bits is demodulated as according to the second group of bits. By translating the third group of bits to the origin of the signal constellation in two steps, first the rotationally invariant cluster, and then the further cluster within the cluster, the same simple symbol recovery can be applied as for the first group of bits, and the second group of bits. The clusters within clusters are rotationally invariant after translation to the origin. For still more complicate signal configurations the same detection mechanism can be applied. The constellations can than be made to be beyond 2-resolution. Depending on the signal-to-noise ratio, the receiver can decide up to which resolution the symbols are detected. For example, when too high a BER (Bit Error Rate) is observed in the receiver for a particular resolution, the receiver can only detect the symbols with a lower resolution.

In an embodiment of a digital communication system according to the present invention a phase reference signal is recursively determined from the rotated received symbols, and a center of the rotated cluster is estimated by dividing the phase reference signal through the number of received symbols, the rotated cluster being translated through vectorial subtraction of a currently rotated received symbol and the cluster constellation points with the estimated center. It is thus achieved that the translation vector is updated with each received vector, resulting in an accurate translation with each received symbol.

In a further embodiment of a digital communication system according to the present invention the second group of bits is determined from the rotated and translated cluster by determining a minimum squared Euclidean distance between the rotated and translated received symbol and the constellation points of the rotated and translated cluster. Thus, a simple decision criterion is obtained for detecting the second group of bits. For a (2,2)-QAM system, i.e. a signal constellation with 16 constellation points, a minimum Euclidean distance is achieved by determining whether a rotated and translated symbol is located in a sector of two notional axes which form 45° angles with the determined reference phase.

In a further embodiment of a digital communication system according to the present invention the phase reference signal is updated for each received symbol by subtracting therefrom a vector corresponding to the determined second group of bits. Herewith the estimate for the channel state is both updated with phase and amplitude information of the received symbols. With this fine phase and amplitude recovery an accurate reference phase is obtained.

Further embodiments set forth herein. When the first group of bits is non-differentially encoded, from the received a priori known reference symbol an initial decoding value is derived. When differential encoding for the first group of bits is applied, the first received symbol, not necessarily known a priori, serves as a reference symbol for detecting successive symbols.

BRIEF DESCRIPTION OF THE DRAWINGS

The present invention will now be described, by way of example, with reference to the accompanying drawings, wherein.

Throughout the figures, the same reference numerals are used for the same features.

DETAILED DESCRIPTION OF THE PREFERRED EMBODIMENTS

Figure 1:
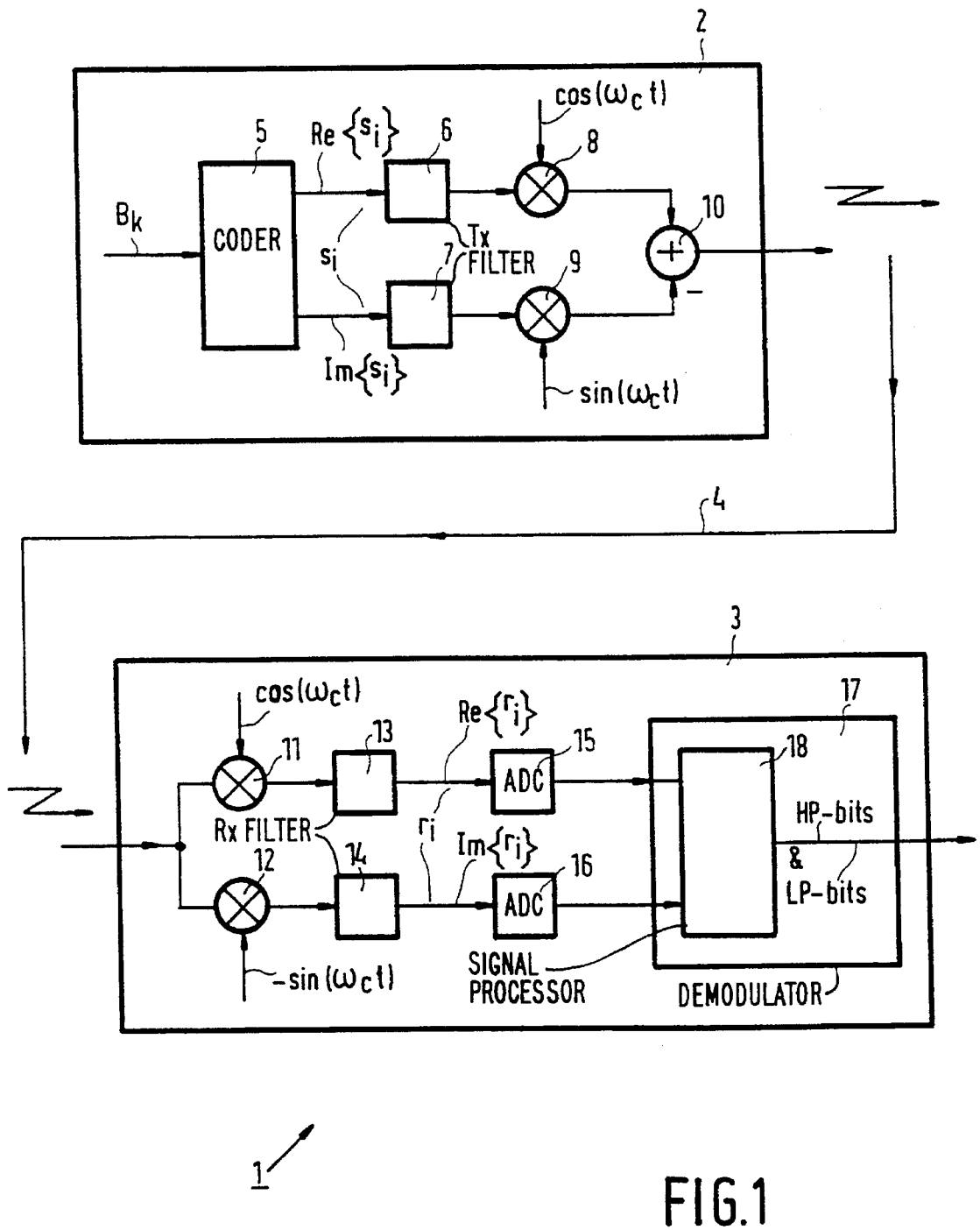
FIG. 1, shows a digital communication system according to the present invention.
Figure 2:
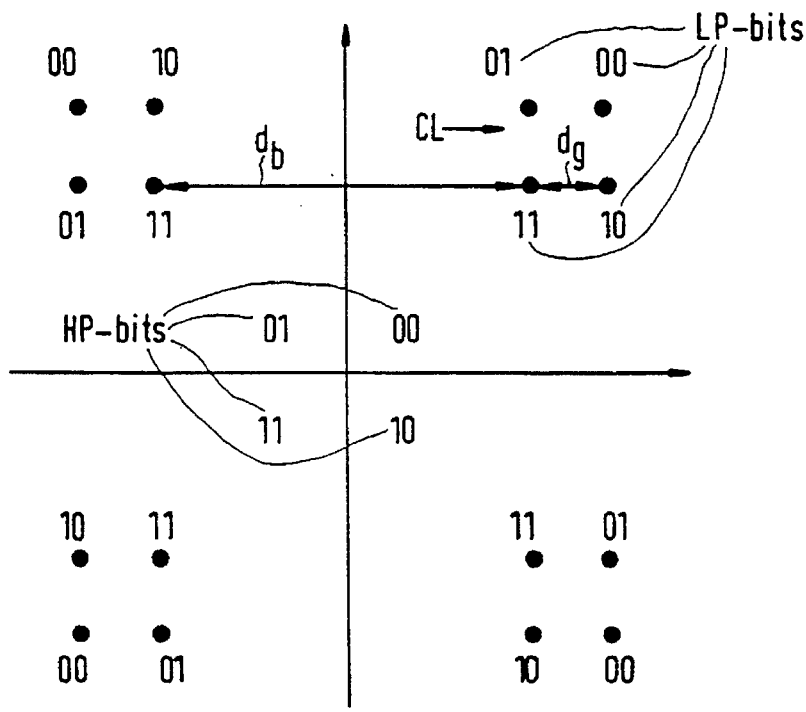
FIG. 2 shows a 2R(2,2)-QAM signal constellation.

FIG. 1 shows a digital communication system 1 according to the present invention comprising a transmitter 2 for transmitting digital messages representing complex symbols $s_i$ to a receiver 3 via a transmission channel 4. The digital messages can be binary messages but also another logic is possible such as ternary and quaternary logic, for instance. The symbols $s_i$ are modulated onto a carrier. The modulated symbols are quadrature modulated 2R(2,2)-QAM signals, i.e. the symbols from a complex-valued alphabet are representable as symbol vectors in a signal constellation. For allowing two-resolution detection, in the signal constellation, constellation points are non-uniformly spaced. In each of the four quadrants of the signal constellation, four constellation points are spaced relatively close together, whereas the so formed clusters of constellation points are spaced further apart form each other. For further details with respect to signal constellations referred is to said Chapter 6.5 of said handbook of Lee et at. Modulated is a source bit stream $B_k$, which is first coded by means of a coder 5, in an embodiment, a first group of two bits, or the so-called HP (high priority) bits, being differentially encoded, and a second group of bits, or the so-called LP (low priority) bits, being non-differentially encoded. As can be seen in FIG. 2, the HP-bits in the respective quadrants are "00", "01", "11", and "10", the bits "00" being in the first quadrant, and the LP-bits "00", "01", "11", and "10" being rotationally invariant as to the four quadrants. In the signal constellation, a cluster distance $d_b$, and a distance $d_g$ between constellation points within a cluster CL are indicated. The coder 5 supplies two symbol sequences Re{si} and Im{si} to respective transmit filters 6 and 7, of which outputs are fed to multipliers 8 and 9 which multiply the respective output signals of the filters 8 and 9 with quadrature carriers $\cos(\omega_c t)$ and $\sin(\omega_c t)$, $\omega_c$ being the carrier frequency and t being time. Such a transmitter 2 is well-known in the art. See, for example said handbook of Lee, pages 167–172. The symbols can also be modulated onto multiple carriers as so-called OFDM signals (Orthogonal Frequency Division Multiplexed) signals, such as described in U.S. Pat. No. 5,345,440 and patent application WO 92/05646. Then, the output of the coder 5 is subjected to an N-points Inverse Discrete Fourier Transform, before modulation onto a carrier, N being an integer. At receiver side, the present invention is then applied to each subcarrier of the OFDM signal. The carrier modulated in phase and quadrature signals are combined in an adder 10, and then transmitted to the receiver 3 via the transmission channel 4. The receiver 3 receives a signal which is distorted by the channel 4, i.e. the received signal is an phase and amplitude modulated version of the transmitted signal, further disturbed with noise. It is assumed that the noise is AWGN (Additive White Gausian Noise). In the receiver 3, the received signal is first subjected to carrier demodulation with respective multipliers 11 and 12, followed by respective receive filters 13 and 14. At outputs of the receive filters 13 and 14 a complex carrier demodulated signal $r_i$ is available in the form of a real signal pan Re$\{r_i\}$ and imaginary signal pan Im$\{r_i\}$. The signal $r_i$ can thus be represented as a signal vector in a signal constellation. Such a receiver front end is well-known and for further details as to this kind of receivers. See handbook of Lee et al., pages 184–186. The signal pans Re$\{r_i\}$ and Im$\{r_i\}$ are sampled by means of respective analog-to-digital converters 15 and 16, digital output signals of which are supplied to a demodulator 17 which comprises a signal processor 18. The actual demodulation is carried out by the signal processor 18, which is programmed to implement the present invention, and which contains non-volatile memory for storing the programs for implementing the present invention, and volatile memory for storing program variables. At an output of the digital signal processor 18, a bitstream comprising the HP-bits and the LP-bits is available.

Figure 3:
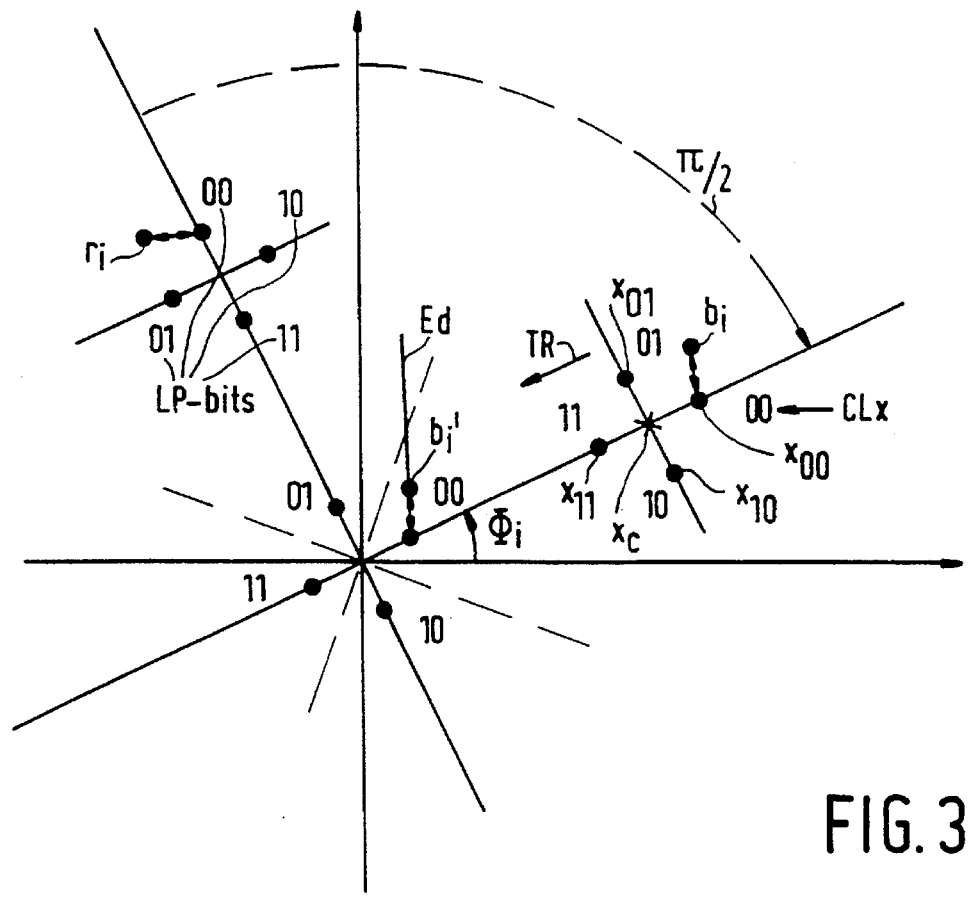
FIG. 3 shows detection of a received symbol in a receiver in a system according to the present invention.

FIG. 3 shows detection of the received symbol $r_i$ in the receiver 3 in the system 1 according to the present invention by means of the digital signal processor 18, the symbol $r_i$ originating from the transmitted symbol $s_i$ representable in a 2R(2,2)-QAM signal constellation according to FIG. 2. For detection of the HP-bits, the channel state can be estimated using the method as disclosed in U.S. Pat. No. 5,345,440 and WO 92/05646, or alternatively with a $M^{th}$ order power loop, known per se, for a 360°/M rotationally invariant constellation, M being a positive integer value greater than 2. When, e.g., applying a $4^{th}$ order power loop, a phase ambiguity being a multiple of $\pi/2$ is eliminated by first multiplying the argument of the received symbol by four and then dividing the result by four, after first having eliminated a modulo $2\pi$ phase from the multiplied argument. With HP-bit detection, the clusters of signal constellation points are considered as single constellation points. The 2R(2,2)-QAM constellation is then considered as a QPSK constellation, corresponding to 4 point signal constellation. At a time instant i, the complex 4 bit encoded symbol $r_i$, 2 HP-bits and 2 LP-bits, is received, the symbol $r_i$ corresponding to the ith transmitted symbol $s_i$. After demodulation of the symbol $r_i$, an updated reference phase $\phi_{i+1}$ is determined, being an argument of a recurrently determined phase reference signal $f_i$. Starting with the first received symbol $r_1$, which is an a priori known reference symbol in case the HP-bits are non-differentially encoded, initial values $f_1=r_1$, and $\phi_2=\arg r_1$, arg being the argument. Then, with the second received symbol $r_2$, and accordingly with further received symbols, the cluster containing the received symbol $r_i$ is rotated over $k_i \cdot \pi/2$, $k_i$ containing information about the HP-bits, such that the rotated vector $b_i$ is within sectors of 45° with respect to $\phi_i$. In the given 2R(2,2)-QAM configuration, $k_i$ is an element of the set $\{0, 1, 2, 3\}$. In case of diffential encoding of the HP-bits, the HP-bits are encoded from a phase difference $\Delta\phi$ of the received symbols $r_i$ and $r_{i-1}$, in the given example a phase difference 0 corresponding to the bits "00", a phase difference $\pi/2$ being corresponding to the bits "01", a phase difference $\pi$ corresponding to the bits "11", and a phase difference $3\pi/2$ corresponding to the bits "10", the phase difference $\Delta\phi$ being $\{(2\pi-k_i\cdot\pi/2)-(2\pi-k_{i-1}\cdot\pi/2) \bmod 2\pi\}$. In case of non-differential encoding, a priori known reference symbols, e.g., $r_1$, determine the absolute decoding reference in the signal constellation, e.g., a reference symbol "00" corresponds to $k_1 = 0$, herewith determining decoding as to the other three constellation points. The thus rotated cluster and rotated received symbol $b_i$, in the example given by $\pi/2$ corresponding to $k_i=1$, contains information about the two LP-bits. According to the present invention, based upon the reference phase estimate $\phi_i$, a four point cluster or constellation CLx is constructed with a center point $x_c$, for which the following relations hold:

$X_{00} = \{(d_b+2d_g)/\sqrt{2} \angle \phi, \angle$ being the angle in the complex plane, $X_{01} = \{((d_b+(1+j)d_g)/\sqrt{2}\angle\phi, j=\sqrt{-1}$, $X_{10} = \{((d_b+(1-j)d_g)/\sqrt{2}\angle\phi$, $X_{11} = \{d_b/\sqrt{2}\}\angle\phi$, and $X_c = \{d_b/\sqrt{2}\}\angle\phi$.

According to the present invention, the cluster CLx and the rotated received signal $b_i$ are translated to the origin O of the complex plane, indicated with TR. The translation TR is implemented by means of vectorial subtraction, i.e. by determining $b_i' = b_i - x_c$. Then, for demodulating the LP-bits, the method disclosed in U.S. Pat. No. 5,345,440 and WO 92/05646 for detecting the HP-bits is applied to the rotated and translated cluster containing the LP-bits, i.e. in $b_i'' = b_i' \angle k_i' \cdot \pi/2$, $k_i'$ is determined such that the most likely transmitted symbol $x_t$ has minimum squared Euclidean distance Ed with $b_i$. For $k_i'=0$, LP-bits "00" are detected, for $k_i'=1$, LP-bits "10" are detected, for $k_i'=2$, LP-bits "11" are detected, and for $k_i'=3$, LP-bits "01" are detected. Using $x_t$, an estimated center $a_i$ of the cluster $b_i$ belongs to, is determined as $a_i = b_i + (x_c - x_t)$. Then, the phase reference signal is updated in the recurrent relation $f_i = f_{i-1} + a_i$. The reference phase $\phi_i$ is updated as $\phi_{i+1} = \arg f_i$. Using $a_i$, in addition to $b_i$ as used with demodulation of an QPSK signal only or an assumed QPSK signal, gives a more accurate estimate of $\phi_{i+1}$. The case of QAM signalling, the average amplitude of the received signals $r_i$ is also estimated. Then, the center $x_c$ of the cluster CLx is estimated from the phase reference signal $f_i$ as $f_i/i$.

Figure 5:
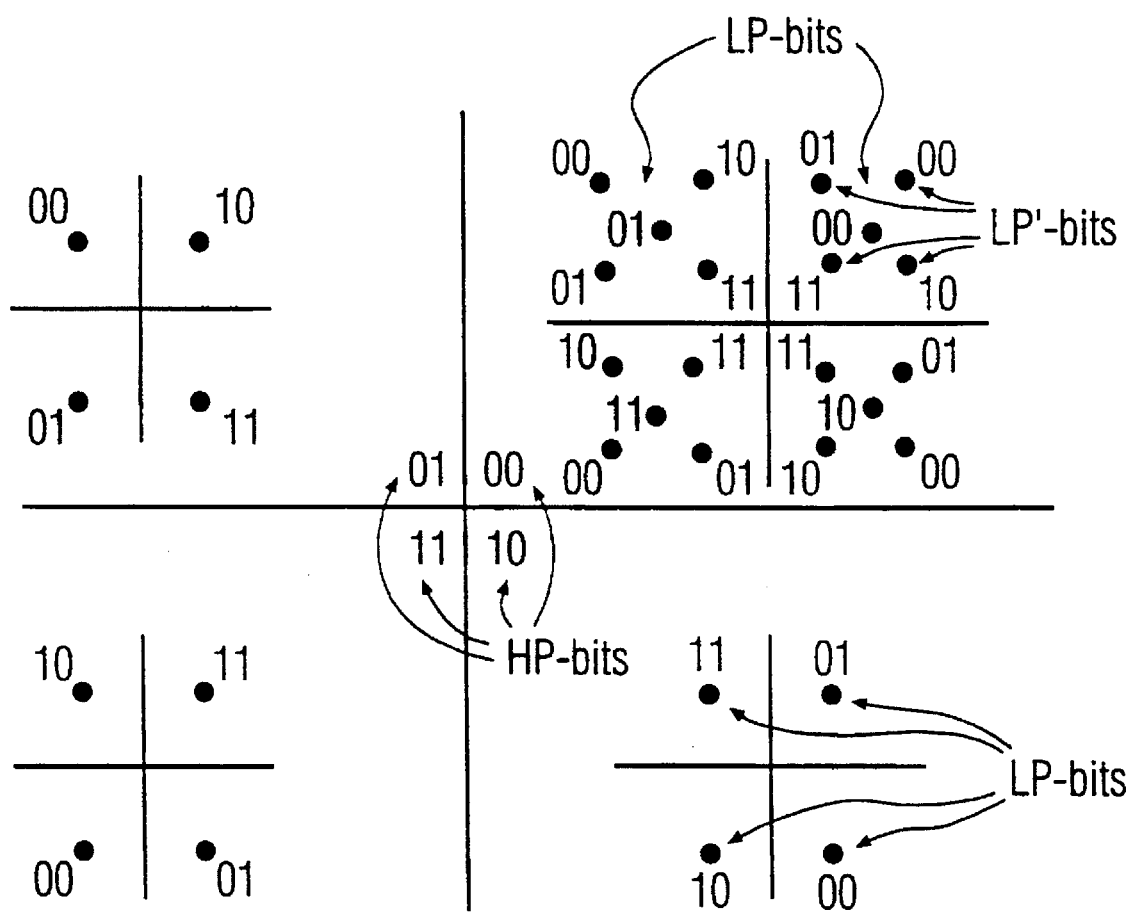
FIG. 5 shows a 64 QAM signal constellation derived from the constellation according to FIG. 2.

The determination of $f_i$ and the estimation of $x_c$ can be made adaptive to tackle small time variances in $\phi$, by alternatively determining $f_i = \alpha \cdot f_{i-1}(1-\alpha) \cdot a_i$ for i>1 with $f_1 = (1-\alpha) \cdot r_1$, in which the center $x_c$ of the cluster CLx is estimated as $f_i/(1-\alpha^i)$, $\alpha$ being in the interval (0,1). For $\alpha=0$, non-coherent reception is provided, whereas for $\alpha$ approaching 1 coherent reception is provided. Such an adaptation can be necessary if the phase recovery is disturbed by channel properties such as multipath fading and frequency instabilities or incorrect frequency adjustment at in the receiver 3. Then, $\phi$ is a time varying function, it being assumed that $\phi$, is constant during transmission of the symbol $s_i$. The parameter $\phi$ determines the adaptation speed of $\phi$. With decreasing $\alpha$, the adaptation speed increases, but then, the BER (Bit Error Rate) also increases. Adaptation also has the advantage that overflow in $f_i$ registers is avoided during calculation. The phase reference signal $f_i$ not necessarily has to be determined recursively, but can also be determined from a number n of previously determined values of $b_i$ or $a_i$, according to the formula $f_i = \Sigma b^j$, $\Sigma$ being a summing sign, the summing being taken from j=i−n+1 to j=i,j and i being integer values. Then, again, $\phi_i = \arg f_i$. For example, n=10. The previous values are stored in a shift register (not shown), the oldest value being shifted out, with a new value each time. The present invention can be recursively applied for clusters within clusters, as shown in FIG. 5, for signal constellations in which clusters itself form rotationally invariant signal constellations. In FIG. 5, each of the LP-bits, shown only for the first quadrant, determine a cluster of LP'-bits. Although the present invention is preferably applied to multi-resolution signal constellations for which there are clear signal-to-noise differences as to respective resolutions, the present invention can also be used for single resolution systems. 2-Resolution can be applied, for instance, for Digital Video Broadcasting. For portable receivers only the HP-bits can be detected, and for fixed receivers, the LP-bits can also be detected, i.e. a normal video mode, and an enhanced video mode is provided, then.

Figure 4:
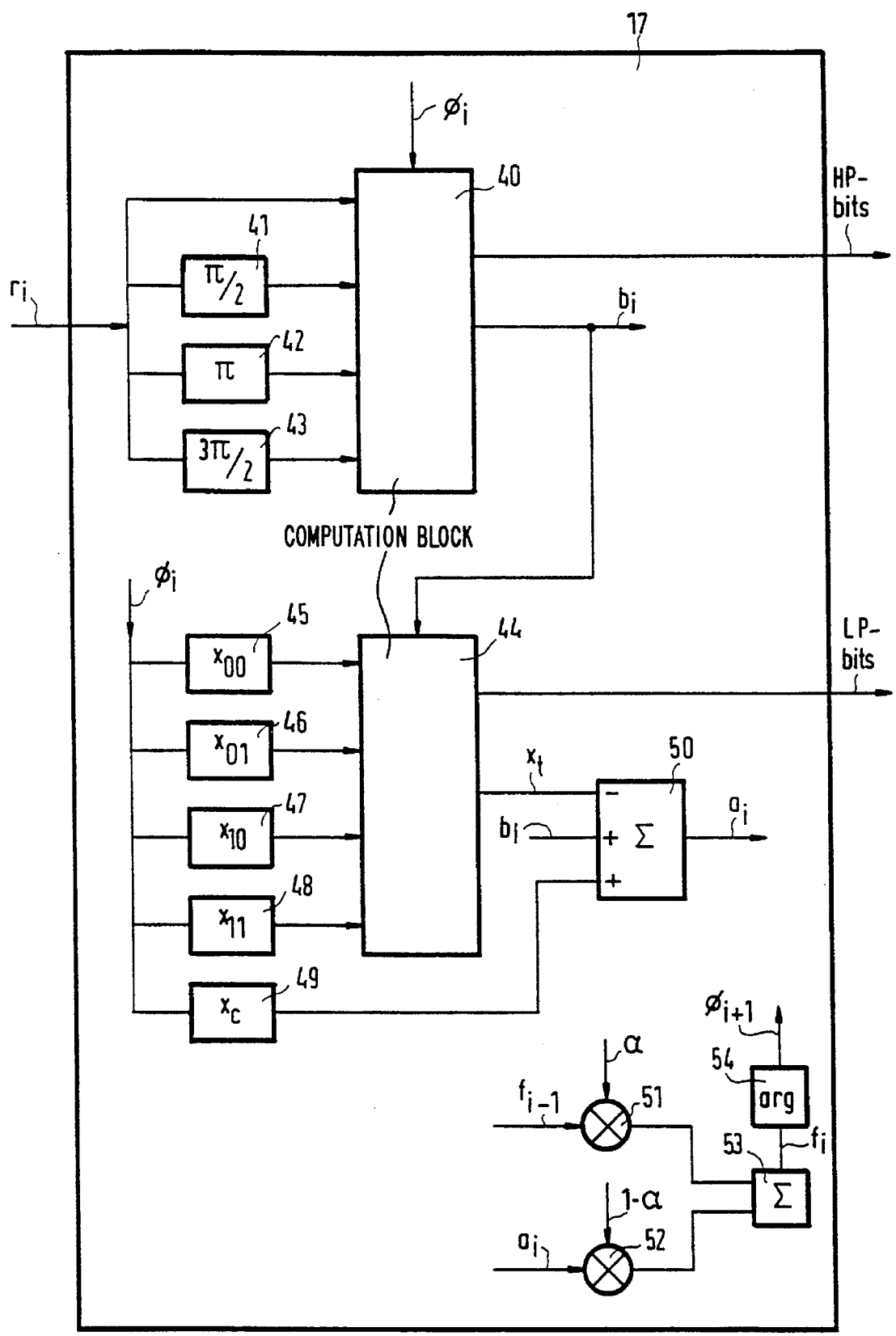
FIG. 4 shows an embodiment of a demodulator according to the present invention.

FIG. 4 shows an embodiment of the demodulator 17 according to the present invention for a 2R(2,2)-QAM signal constellation, implemented with the signal processor 18. In a computation block 40, the signal $b_i$ determined which is within 45° sectors with respect to $\phi_i$, and from $k_i$ thus determined, the HP-bits are determined. For determining $k_i$, rotation blocks 41, 42, and 43 are provided for respective rotation of the received signal $r_i$ with $\pi/2\pi$, and $3\pi/2$. In a computation block 44 the LP-bits are determined, together with the most likely transmitted symbol $x_t$. Inputs to the computation block 44 for the LP-bits and $x_t$ are respective computation blocks 45, 46, 47, and 48 for $x_{00}$, $x_{01}$, $x_{10}$, and $x_{11}$, according to the formulas given. In a summing block 50, to which $x_t$, $b_i$, and further an output of a computation block 49 for computing $x_c$ are supplied, the variable $a_i$ is determined. For adaptive calculation of $f_i$ and thus of $\phi_{i+1}$, multiplying blocks 51 and 52, a summing block 53, and a block 54 for determining the argument of $f_i$ are provided. In case of estimation of $x_c$ a division block is provided for calculating $f_i/i$, or, in case of adaptivity, $f_i/(1-\alpha^i)$, instead of the calculation block 49.

What is claimed is:
1. A digital communication system (1) comprising:
   a transmitter (2) for transmitting digital messages representing symbols ($s_i$) modulated onto at least one carrier, which symbols ($s_i$) are representable as symbol vectors in a signal constellation which is rotationally invariant over a predetermined rotation angle, the signal constellation being partitioned into clusters (CL) of constellation points which coincide when at least once rotated over the predetermined rotation angle, the clusters representing a first group of bits (HP-bits) in the messages and constellation points within clusters representing at least a second group of bits (LP bits) in the messages;
   a transmission channel (4) for transmitting the symbols; and
   a receiver (3) for receiving the symbols transmitting through the channel, having a demodulator (17) for demodulating the received symbols ($r_i$) into received messages (HP-bits, LP-bits), the demodulator (17) using an estimate for a channel state of the channel (4), the first group of bits (HP-bits) being demodulated by rotating a cluster of the constellation containing a received symbol ($r_i$) over an interger number of times of the predetermined rotation angle such that the received symbol ($r_i$) is located in a partition of the signal constellation containing the estimate ($\phi_i$) for the channel state and by determining the first group of bits (HP-bits) from the rotation, and the second group of bits (LP-bits) being demodulated by translating (TR) the rotated cluster (CLx) to an origin (O) of the signal constellation and by determining the second group of bits (LP-bits) from the translated cluster, the estimate being updated with each received symbol ($r_i$).

2. A digital communication system (1) according to claim 1, wherein the constellation points within the clusters represent a third group of bits within the second group of bits, the third group of bits representing a rotationally invariant further cluster within the cluster, and wherein the third group of bits is demodulated by translating the further cluster to an origin (O) of the signal constellation and by determining the third group of bits from the translated further cluster.

3. A digital communication system (1) according to claims 1, wherein a phase reference signal ($f_i$) is recursively determined from the rotated received symbols ($b_i$), and the origin (O) of the cluster is determined as an estimated center ($x_c$) of the rotated cluster by dividing the phase reference signal ($f_i$) through the number of received symbols (i), the rotated cluster being translated (TR) through vectorial subtraction of a currently rotated received symbol ($b_i$) and the cluster constellation points with the estimated center ($x_c$).

4. A digital communication system (1) according to claim 3, wherein the second group of bits (LP-bits) is determined from the rotated and translated cluster by determining a minimum squared Euclidean distance (ED) between the rotated and translated received symbol and the constellation points of the rotated and translated cluster.

5. A digital communication system (1) according to claim 4, wherein the phase reference signal ($f_i$) is updated for receiving a subsequent received symbol ($r_i$) by subtracting therefrom a vector ($a_i$) corresponding to the determined second group of bits.

6. A digital communication system (1) according to claim 3, wherein after determining the second group of bits, an updated reference phase ($\phi_{i+1}$) for the signal constellation for a subsequently received symbol is determined from an argument of the phase reference signal.

7. A digital communication system (1) according to claims 1 wherein the signal constellation is a multi-resolution constellation (2R(2,2)-QAM).

8. A digital communication system (1) according to claim 1, wherein the first group of bits (HP-bits) are differentially encoded.

9. A digital communication system (1) according to claim 1, wherein the first group of bits (HP-bits) are non-differentially encoded, and the transmitted symbols ($s_i$) comprise at least one reference symbol, which is a priori known in the receiver.

10. A receiver (3) for receiving digital messages representing symbols ($s_i$) modulated onto at least one carrier, which symbols ($s_i$) are representable as symbol vectors in a signal constellation which is rotationally invariant over a predetermined rotation angle, said receiver (3) comprising a demodulator (17) for demodulating the received symbols ($r_i$) into received messages (HP-bits, LP-bits), the demodulator (17) using an estimate for a channel state of a channel (4), characterized in that the signal constellation is partitioned into clusters (CL) of constellation points which coincide when at least once rotated over an integer number of times of the rotation angle, the clusters representing a first group of bits (HP-bits) in the messages and constellation points within clusters representing at least a second group of bits (LP-bits) in the messages, and in that the first group of bits (HP-bits) is demodulated by rotating a cluster containing a received symbol ($r_i$) over the predetermined rotation angle, such that the received symbol ($r_i$) is located in a partition of the signal constellation containing the estimate ($\phi_i$) for the channel state and by determining the first group of bits (HP-bits) from the rotation, and the second group of bits (LP-bits) is demodulated by translating (TR) the rotated cluster (CLx) to an origin (O) of the signal constellation and by determining the second group of bits (LP-bits) from the translated cluster, the estimate ($\phi_{i+1}$) being updated with each received symbol ($r_i$).

11. A receiver (3) according to claim 10, wherein the constellation points within the clusters represent a third group of bits within the second group of bits, the third group of bits representing a rotationally invariant further cluster within the cluster, and wherein the third group of bits is demodulated by translating the further cluster to an origin (O) of the signal constellation and by determining the third group of bits from the translated further cluster.

12. A receiver (3) according to claim 10, wherein a phase reference signal ($f_i$) is recursively determined from the rotated received symbols ($b_i$), and the origin (O) of the cluster is determined as an estimated center ($x_c$) of the rotated cluster by dividing the phase reference signal ($f_i$) through the number of received symbols (i), the rotated cluster being translated (TR) through vectorial subtraction of a currently rotated received symbol ($b_i$) and the cluster constellation points with the estimated center ($x_c$).

13. A receiver (3) according to claim 12, wherein the second group of bits (LP-bits) is determined from the rotated and translated cluster by determining a minimum squared Euclidian distance (Ed) between the rotated and translated received symbol and the constellation points of the rotated and translated cluster.

14. A receiver (3) according to claim 13, wherein the phase reference signal ($f_i$) is updated for receiving a subsequent received symbol ($r_i$) by subtracting therefrom a vector ($a_i$) corresponding to the determined second group of bits.

15. A receiver (3) according to claim 12, wherein after determining the second group of bits, an updated reference phase ($\phi_{i+1}$) for the signal constellation for a subsequently received symbol is determined from an argument of the phase reference signal.

16. A receiver (3) according to claim 10, wherein the signal constellation is a multi-resolution constellation (2R(2, 2)-QAM).

17. A receiver (3) according to claim 10, wherein the first group of bits (HP-bits) are differentially encoded.

18. A receiver (3) according to claim 10, wherein the first group of bits (HP-bits) are non-differentially encoded, and the transmitted symbols ($s_i$) comprise at least one reference symbol, which is a priori known to said receiver.

19. A receiver (3) having graceful degradation characteristics, for receiving digital messages representing symbols ($s_i$) modulated onto at least one carrier transmitted over a transmission medium, which symbols ($s_i$) are representable as symbol vectors in a signal constellation which is rotationally invariant over a predetermined rotation angle, the signal constellation being partitioned into clusters (CL) of constellation points which coincide when at least once rotated over an integer number of times of the rotation angle, the clusters representing a first group of bits (HP-bits) in the messages and constellation points within clusters representing at least a second group of bits (LP-bits) in the messages, comprising a demodulator (17) for demodulating a series of received symbols ($r_i$) into received messages (HP-bits, LP-bits), using an estimate for a channel state of the channel (4), the first group of bits (HP-bits) being demodulated by rotating a cluster containing a received symbol ($r_i$) over the predetermined rotation angle, such that the received symbol ($r_i$) is located in a partition of the signal constellation containing the estimate ($\phi_i$) for the channel state and by determining the first group of bits (HP-bits) from the rotation, and the second group of bits (LP-bits) is demodulated by translating (TR) the rotated cluster (CLx) to an origin (O) of the signal constellation and by determining the second group of bits (LP-bits) from the translated cluster, the channel state estimate ($\phi_{i+1}$) being based on previously received symbols, said receiver being capable of demodulating the first group of bits (HP-bits) in the presence of greater transmission channel interference than the second group of bits (LP-bits).

\* \* \* \* \*